Dec. 13, 1966     S. A. HATCH ETAL     3,291,494
END FACE SEAL ASSEMBLY
Filed Oct. 22, 1965     2 Sheets-Sheet 1

Inventors:
Seymour A. Hatch,
James P. Morley,
Richard W. Blair,
By Greist, Lockwood,
Greenawalt & Dewey     Attys Dec. 13, 1966 S. A. HATCH ETAL 3,291,494
END FACE SEAL ASSEMBLY
Filed Oct. 22, 1965 2 Sheets-Sheet 2

Inventors:
Seymour A. Hatch,
James P. Morley,
Richard W. Blair,
By Greist, Lockwood,
Greenawalt & Dewey
Attys United States Patent Office 3,291,494
Patented Dec. 13, 1966

3,291,494
END FACE SEAL ASSEMBLY
Seymour A. Hatch, Forest Park, James P. Morley, Morton Grove, and Richard W. Blair, Arlington Heights, Ill., assignors to Chicago Rawhide Manufacturing Company, Chicago, Ill., a corporation of Illinois
Filed Oct. 22, 1965, Ser. No. 501,700
2 Claims. (Cl. 277—92)

The present invention is a continuation-in-part of our copending application, Serial No. 155,640, filed November 29, 1961, issued as U.S. Patent No. 3,241,843, on March 22, 1966. The invention is directed to a new and improved seal assembly of the general rotary end face type, the invention also being directed to a new and improved installation in which the seal assembly is mounted in a unique operational manner.

There are many known uses for rotary end face seals. Such uses include track roller installations in endless tread tractor units. This particular type of installation is representative of rather extreme requirements for end face seal operational life and efficiency. The seal not only must retain the lubricant but must also continue to function efficiently in the presence of foreign matter such as dirt and the like as well as under extreme weather conditions. Basic rotary end face seal designs have included a sealing ring engaged with a mating ring or mating surface, the sealing ring being provided with spring means acting in an axial direction and maintaining the sealing ring in end face running engagement with the mating surface, axially adjustable sealing ring interlocking means to transmit driving torque to the sealing ring, and secondary sealing means protecting the spring and interlock arrangement from dirt and the like to maintain efficient functioning thereof. Seals of this design are rather complicated, difficult to install, difficult to maintain, expensive, and often unreliable due to the design and operational complexities involved.

Efforts have been made to improve rotary end face seal operation and design. To a certain extent, these efforts have been directed toward the reduction in the total number of parts necessary in end face seal operation. Sealing and mating rings of special configuration have been combined with specially designed secondary sealing members which are intended to provide requisite end face sealing pressure, sealing ring driving torque, and secondary sealing between the ring and a part of the housing or shaft of the installation. The designs resulting from these efforts still leave must to be desired with regard to operational efficiency, economy in fabrication, and ease of installation. In this respect it has been found exceedingly difficult to combine in a single secondary member the various properties necessary to provide the three main and entirely different functions originally performed by three different elements.

It is an object of the present invention to provide a new and improved end face seal assembly and installation including the same, the assembly basically comprising a sealing ring and secondary sealing member which co-operate in a new and improved manner to provide long trouble-free and efficient operation while permitting economies in fabrication and installation.

Another object is to provide a new and improved rotary seal formed from a sealing ring and a uniquely designed and positioned secondary compressible sealing member, the secondary member being of such design and arrangement to provide improvements in seal operation, this secondary member not only being capable of supplying the three essential functions of sealing pressure, seal operational torque, and efficient secondary sealing, but also improving certain aspects and characteristics of these functions.

Still another object of the invention is to provide critical design criteria for thickness ratios and angularity of the neutral axis of secondary sealing members for use in end face sealing arrangements in which the secondary sealing members support, seal and bias sealing rings into sealing engagement with each other.

Other objects not specifically set forth will become apparent from the following detailed description of the invention made in conjunction with the accompanying drawings wherein.

Basically, the seal assembly of the present invention comprises a sealing ring engaged by a frusto-conical secondary sealing member which is formed from distortably compressible rubber or rubber-like material. The secondary sealing member is designed and arranged to engage the sealing ring in the installed condition of the assembly and to apply to the sealing ring radial and axial force components, which radial force component may be of substantial magnitude within a wide range to meet greatly variable driving torque and secondary seal requirements. In the installed condition, the secondary sealing member is compressed in an axial direction. An unusually wide range of operational force conditions is available due to the particular design and unique structural arrangement of the seal assembly of this invention. In bringing this about, the installed angle of the secondary sealing member will preferably be within the range of from about 35° to 0° as measured from a perpendicular to the shaft and seal center axis. In general, the secondary sealing member is designed and arranged to be compressed to an extent and into a position relative to the sealing ring whereby an adequate axial force component is applied to the sealing ring for efficient sealing engagement with a mating surface and a sufficient or even very substantially greater radial force component can be applied to the sealing ring for efficient torque transmission thereto through the secondary sealing member. Additionally, there is controlled positioning of the sealing ring during extended operational use thereof, sufficient axial movement of the sealing ring as is required to maintain efficient running engagement with a mating surface is still available, and an efficient secondary seal between the sealing ring and a part of the installation is maintained.

Figure 1:
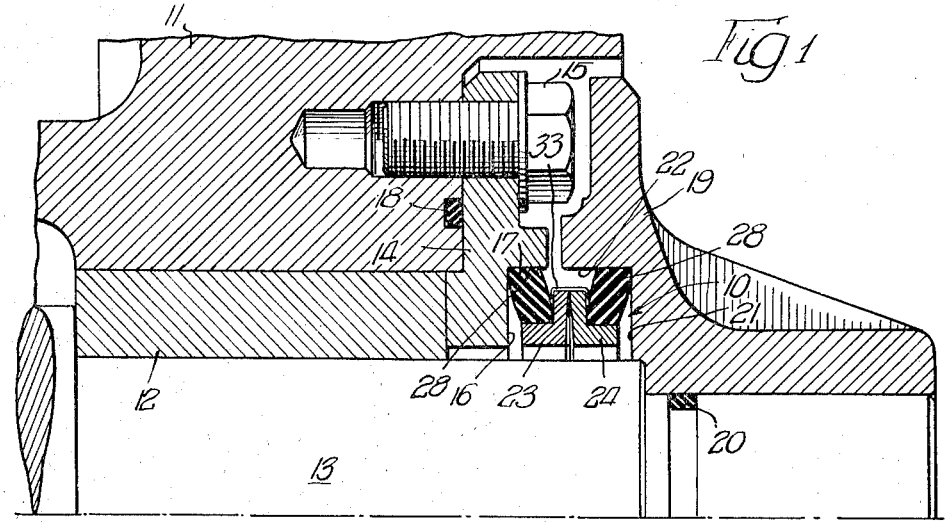
FIG. 1 is a fragmentary half section of a track roller installation illustrating one form of the new and improved seal assembly of the invention in installed operative position.
Figure 2:
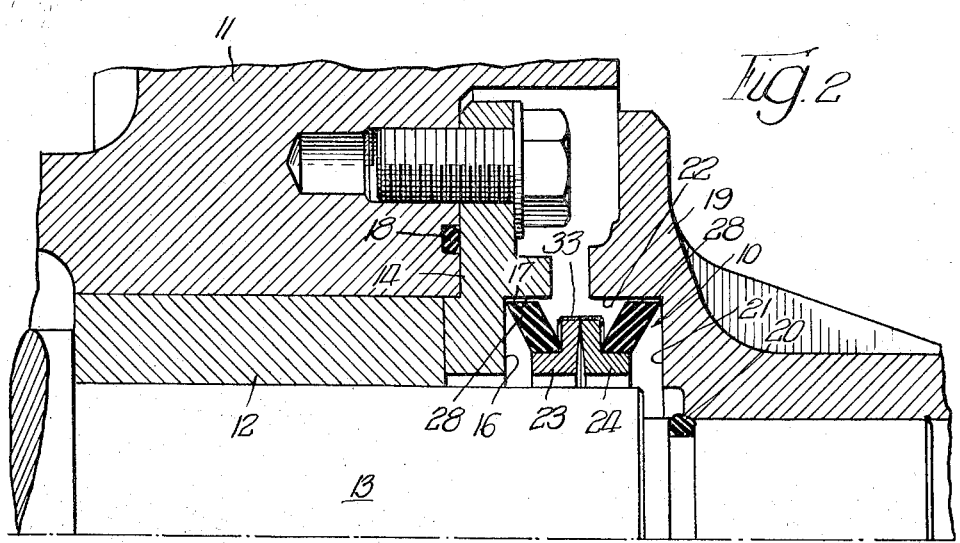
FIG. 2 is a view similar to FIG. 1 illustrating the installation just prior to completed assembly thereof.

FIGS. 1 and 2 illustrate a typical track roller installation including one form of the seal assembly of the present invention, this particular form being identified by the numeral 10. The installation includes a track roller 11 mounted on a main bearing 12 for rotation about a shaft 13. A thrust plate 14 is fixed to the roller 11 by a plurality of fasteners 15 and engages the outer end of the main bearing 12. The thrust plate 14 is formed with an outer surface annular recess defined by a radial surface 16 and an axial surface 17 which are joined at right angles. A suitable O-ring unit 18 forms a seal between the thrust plate and track roller 11. The outer end of the roller shaft 13 has mounted thereon a track shaft cap 19 which is suitably fixed on the shaft 13 and which is axially movable outwardly therealong for seal assembly installation The cap 19 includes suitable fastener means (not shown) to fix the same on the shaft 13. An O-ring sealing unit 20 is located between the outer reduced end of the shaft 13 and the cap 19. This cap includes an inwardly opening annular recess portion defined by a radial wall surface 21 joined with an axial wall surface 22 in right angle relation. The seal assembly 10 is mounted about the shaft 13 in spaced relation therewith and is engaged between the thrust plate 14 and cap 19.

Figure 3:
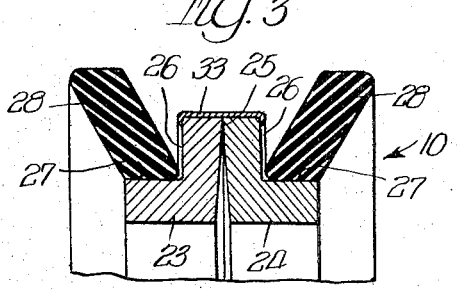
FIG. 3 is an enlarged fragmentary section of the seal assembly used in FIGS. 1 and 2.
Figure 4:
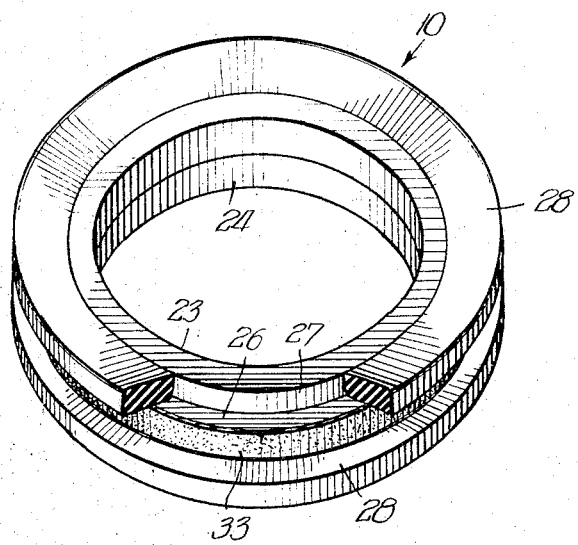
FIG. 4 is a fragmentary perspective of the seal assembly.

FIGS. 3 and 4 best illustrate the seal assembly 10. This assembly comprises a pair of co-operating rings 23 and 24 having inner diameters greater than the diameter of the shaft 13. The rings 23 and 24 are of the same design and each may be considered a sealing ring or one may be considered the sealing ring and the other the mating ring or member. The rings 23 and 24 each include an end face annular sealing surface 25 which as illustrated is located adjacent the outer peripheral edge of the radially directed segment of each ring. These rings are of generally L-shape and each ring is formed with a right angled outwardly facing recess defined by a radial wall surface 26 and an axial wall surface 27. Comparing FIGS. 1–3, it can be seen that the sealing ring surfaces 26 and 27 are arranged relative to the co-operating thrust plate surfaces 16 and 17 and cap surfaces 21 and 22 to geometrically define therewith a generally rectangular secondary seal area.

Figure 5:
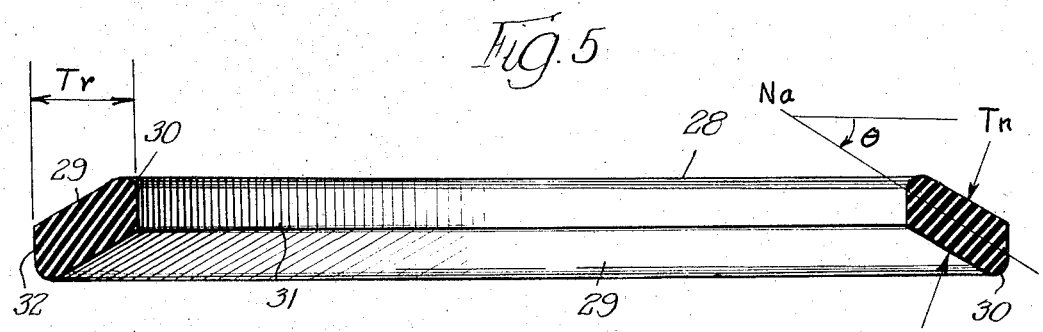
FIG. 5 is a fragmentary section of one of the secondary sealing members of the assembly.

The secondary seal for each of the sealing rings 23 and 24 is provided by an elastomer 28 of generally frustoconical shape and formed from rubber or rubber-like material which is deformable. FIG. 5 illustrates a preferred form of elastomer 28 which is provided with parallel inclined side surfaces 29 each terminating in a radius 30 at one end thereof and at the opposite end thereof terminating in generally right angled shape by juncture with flat end surface portions 31 and 32. The geometry of the combined surfaces of the member 28 is such that the member is reversible in that it can be mounted on either of the sealing rings 23 and 24. With regard to the specific assembly 10, the flat end surface portion 32 defines the outer diameter of the member 28 and the opposite flat end surface portion 31 defines the inner diameter, this surface portion being mounted against the axial surface 27 of a ring. The convex corners 30 are adapted to be received at the juncture of the right angled surfaces 26 and 27 of a sealing ring 16 and 17 of the thrust plate 14, and 21 and 22 of the cap 19.

Referring particularly to FIGS. 3 and 4, the sealing rings 23 and 24 are held in end face engagement prior to and during installation by a circumferentially arranged strip-like closure means 33 overlying the peripheral mating edges of the sealing surfaces 25 and extending inwardly in overlapping relation along the radial surfaces 26. The closure strip 33 holds the sealing rings in assembled relation, the secondary sealing member 28 being retained on the sealing rings by reason of frictional engagement with the axial surfaces 27. The closure strip 33 may be formed from a cellulose band of a type which is well known and sometimes used in establishing a breakable seal between a closure cap and a bottle. The cellulose band is maintained in a suitable solution which causes the cellulosic material to swell, is applied in wet form in overlying relation circumferentially about the rings 23 and 24, and upon drying shrinks into tight engagement therewith. The band exhibits sufficient strength to hold the rings in assembled condition prior to and during installation to form a complete cartridge-type package for handling, shipping, installation, etc. This band greatly aids in the installation of the complete seal assembly and need not be removed from the assembly following installation thereof. Upon operation of the track roller installation of FIG. 1, the torque transmitted to the sealing ring 23 by the track roller 11 will be sufficient to break the band 33, the material of this band ultimately being disintegrated in the installation without causing any operational difficulties. Any material capable of providing the functions described may be used in forming the closure band 33. Furthermore, this particular aspect of the invention is not limited to use solely with the new and improved types of seal assemblies disclosed therein.

FIG. 2 illustrates positioning of the seal assembly 10 in the track roller unit just prior to complete closing thereof and final positioning of the cap 19. It will be noted that in this condition the seal assembly 10 retains its initial configuration as shown in FIGS. 3 and 4. However, the secondary sealing members 28 are designed so that upon complete closing and final positioning of the cap 19 they become compressively distorted axially toward one another and radially inwardly to a rather substantial degree as illustrated in FIG. 1. Compression to a substantial extent constitutes an important aspect of efficient utilization of the seal assembly of the present invention. The final angularity of the installed secondary sealing members 28 is changed to an extent that radial and axial force components of sufficient relative magnitude are applied against the sealing rings 23 and 24 as well as against the right angled mounting surfaces engaged with the outer diameters of the members 28. The distortion of the secondary sealing members 28 from their free position to their installed position creates shear and compression forces to supply efficient seal face loading and supply a relatively high contact force for secondary sealing and torque transmission to the sealing ring. By referring to the secondary sealing member being compressed in an axial direction, it is intended to cover the actual distortion which the secondary sealing member undergoes upon completed installation bearing in mind that technically rubber is not compressible. Such distortion involves the application of a load in an axial direction resulting in a substantial foreshortening or deformation of the secondary sealing member accompanied by radial growth to wedge the secondary sealing member in radially resiliently acting position between the sealing ring and a part of the housing. In this position the secondary sealing member is in shear and compression, the shear condition being primarily responsible for the axial force component developed and the compression condition being primarily responsible for the radial force component developed. It has been found that the forces establishing the secondary seal and torque transmission may be greatly increased by reason of the design of the seal assembly of the present invention while maintaining sealing face loading within an efficiently usable range. Among other advantages, this discovery results in a great simplification of end face seal designs and eliminates the use of auxiliary mechanical interlocks as well as secondary seal elements, such as relatively weak or fragile flexible diaphragms, while maintaining efficient end face sealing thrust. An important aspect of the improvement resides in the utilization of a compressible secondary seal which upon installation is placed in shear as well as compression to provide the new and improved results.

By use of the general frusto-conical shape in forming a compressible secondary sealing member of the type described, it is possible to position one diameter of the secondary member statically on the sealing ring and the other diameter statically on the co-operating part of the installation. This design permits conversion of compressive strains and forces established in the secondary member itself into effectively directed or applied forces at the mating surfaces of the sealing rings.

Figure 6:
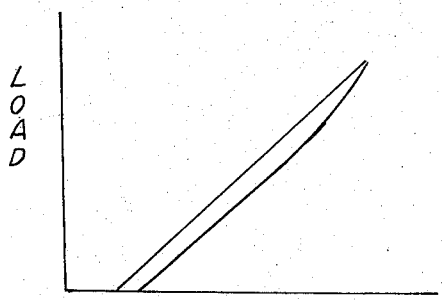
FIG. 6 is a typical load-deflection diagram for seals of this type.

A load deflection diagram is shown in FIG. 6 which typifies the operation of the seal unit shown in designs using mating faces biased by frusto-conical secondary sealing members. When load in pounds is plotted against deflection in inches, the relationship is substantially linear as graphically shown which provides good stability. This relationship can be accurately predicted for any given size of seal by control of critical variables at design and manufacture as will be described. This unusual relationship and conversion of compressive strains and forces may be used to provide the secondary sealing member with a considerably greater static sealing force than the face loading force also supplied thereby wherever desired. In other words, this conversion may be used to maximize the frictional forces existing at the static sealing faces so that a considerable torque may be transmitted by the secondary member. It will be appreciated that variations in axial and radial forces are available in a given installation by mere control of secondary sealing member compressive positioning upon installation, thus eliminating the existing practice of substituting springs of different ratings.

In the seal arrangement illustrated in FIGS. 1–3, stability during operation becomes a dominant design factor, since unstable operation in a dirty environment will permit entry of foreign matter between the faces with the resultant adverse effect. Spring rate is thus affected also inasmuch as it is related to stability. Also of prominent consideration is the necessity for the secondary seal member to support the associated sealing face and prevent rotation relative to the part on which it is carried.

It has been found that the secondary sealing member 28 will exhibit the requisite desired sealing action and biasing properties if formed within definite angular limits and to definite thickness ratios. As seen in FIG. 3, a typical mirror image type installation includes identical secondary sealing members 28. This is sometimes also referred to as a "back-to-back" or "series-type" design as contrasted with a single secondary seal biasing a sealing ring against a rigidly mounted mating ring on a shaft carried in a housing or the like where the compression of the secondary seal is determined by the total operating width. The sealing plane or sealing interface in the single secondary seal design is determined by the non-movable or fixed mating ring. Design considerations in this type of sealing arrangement are such that a low spring rate or one that approaches zero is most desirable. This design consideration is not applicable to the series arrangement shown in FIGS. 1–3 as the position and plane of the sealing interface is determined by the location of equal force points on the spring characteristics of the two secondary seals 28, so that their combined deflection is equal to the total compression of the seal. Accordingly, the spring rate in such designs should be positive for the entire operating range, which as seen in FIG. 6, has been achieved.

Ideally, the sealing interface or plane of contact at the sealing faces should be at right angles to the axis of rotation, however, since perfect circumferential symmetry cannot be achieved the sealing faces take an inclination relative to the ideal sealing interface. If improperly designed, a small inclination of the sealing interface relative to a plane perpendicular to the shaft will cause the seal to become unstable, and inclination will increase until one of the sealing ring members 23 or 24 is restrained by a part of the housing in which it is carried. Under such circumstances, the unstable condition may cause the sealing faces to separate, permiting grit, dirt and other foreign and deleterious materials to enter. When this occurs, the wearing of the faces is expedited.

By application of the principles of the present invention, it has been found that the desired properties to obtain the optimum operational characteristics can be predetermined for seal designs of varying shaft sizes. In the relaxed or free state shown in FIG. 5, the effective portion or neutral axis $N_a$ of the elastomeric sealing member 28 must be formed on an angle Theta ($\theta$) which is between about 25° and about 35° as measured from a plane perpendicular to the seal center axis. An average between these angular limits of 30° has been found to be most desirable, since sufficient axial travel is available to maintain the faces in contact. While the secondary seal 28 may be modified at its inner or outer periphery or both to provide means to enhance the ease of installation, the effective force transmitting portion or neutral axis of a half section is of general frusto-conical contour as represented by the line $N_a$ in FIG. 5.

If operational performance is to be predictable as outlined above, certain ratios on thickness have also been found to be applicable to all the secondary seals for "series-type" sealing arrangements. The ratio of radial thickness of a half section of an elastomeric secondary seal, as represented by $T_r$ on FIG. 5, compared with the normal thickness $T_n$ which is taken normal to the neutral axis, must be in a proportion of no less than a value of about 1.25, and no greater than a value of about 2.25. In mathematical form:

$$1.25 < T_r/T_n < 2.25$$

wherein $T_r$ is the radial thickness between inside and outside diameters measured in a plane perpendicular to the generating axis of the secondary seal and $T_n$ is the normal thickness of the secondary sealing element measured at right angles to the neutral axis at its section of average effective thickness.

The seal assembly 10 has been subjected to severe operational tests with surprising results. The right angled surfaces engaged by the secondary sealing members 28 to define static seals were polished smooth and supplied with a coating of grease. Slippage was noted only after the sealing ring surfaces were substantially overloaded and the starting torques applied was so great as to exceed expected operational conditions. Nevertheless, no leakage occurred and the seal continued to perform satisfactorily without being dismantled. As a result of tests it has been found that the secondary sealing members 28 are capable of breaking loose sealing rings which are frozen to mating surfaces at temperatures as low as minus 65° F. without attendant slippage.

While the secondary sealing members illustrated and described herein are termed as "frusto-conical," it will be understood that the invention is of a scope sufficient to include the use of secondary sealing members of shapes other than true "frusto-conical" shape. As long as a secondary sealing member is shaped to permit adequate axial and radial compression thereof in the manner and to the extent described to provide the requisite function, such as a secondary sealing member comes within the scope of this invention.

Obviously, certain modifications and variations of the invention as hereinbefore set forth may be made without departing from the spirit and scope thereof, and therefore only such limitations should be imposed as are indicated in the appended claims.

We claim:

1. In an end face seal sasembly for installation in a shaft assembly, said seal assembly including a pair of sealing rings each having a radial outer end face sealing surface for positioning freely about a shaft in mutual end face surface sealing engagement, a periphery of each of said sealing rings axially rearwardly of said sealing surface defining divergent generally axially and radially directed surface portions presenting circumferential continuity, said surface portions defining therebetween a rearwardly opening seat for readily accessible force loading of said sealing rings, and a pair of secondary sealing and driving members formed solely from distortively resilient solid rubber material and each in the form of a ring provided with an effective frusto-conical shape removably and solely frictionally and slidably mounted in said seats, the cross sectional configuration of each of said secondary sealing members further generally conforming to a parallelogram having radially inclined side surface portions and an end surface portion extending in an axial direction and being in rearwardly unconfined removable frictional and slidable engagement with the axially directed surface portion of a sealing ring seat, said secondary sealing members extending rearwardly from said sealing rings in inclined relation thereto with a leading edge of each of said end surface portions in abutting but radially unconfined engagement with the radially directed surface portion of a sealing ring seat, said secondary sealing members being adapted for similar axial and radial engagement by the other end surface portions thereof with parts of said shaft assembly spaced radially and rearwardly from said divergent surface portions of each of said sealing rings for unrestricted axial and radial distortive resilient spring action of said secondary sealing members upon operative mounting of said seal assembly in said shaft assembly to supply a face loading force to each of said sealing rings and simultaneously frictionally interlock said sealing rings, secondary sealing members and shaft assembly parts, and the axially directed surface portions of said sealing ring seats being at least coextensive with said first named end surface portions of said secondary sealing members for unrestricted transmission of loading force to said sealing rings upon operative mounting of said seal assembly, the improvement which comprises the effective frustoconical shape of each of said secondary sealing members being formed on a molded angle which falls between about 25° and about 35°, and the ratio of radial thickness of each of said secondary sealing members measured perpendicular to the longitudinal axis thereof to the average effective thickness measured normal to the effective frusto-conical shape of said secondary sealing members being between about 1.25 to about 2.25 to provide stable operation of said seal assembly.

2. In an end face seal assembly for installation in a shaft assembly, said seal assembly including a pair of sealing rings each having a radial outer end face sealing surface for positioning freely about a shaft in mutual end face surface sealing engagement, a periphery of each of said sealing rings axially rearwardly of said sealing surface defining divergent generally axially and radially directed surface portions presenting circumferential continuity, said surface portions defining therebetween a rearwardly opening seat for readily accessible force loading of said sealing rings, and a pair of secondary sealing and driving members formed solely from distortively resilient solid rubber material and each in the form of a ring provided with an effective frusto-conical shape with end surface portions mounted in said seats, said secondary sealing members extending rearwardly from said sealing rings in inclined relation thereto with a leading edge of each of said end surface portions in abutting but radially unconfined engagement with the radially directed surface portion of a sealing ring seat, said secondary sealing members being adapted for similar axial and radial engagement by remaining end surface portions thereof with parts of said shaft assembly spaced radially and rearwardly from said divergent surface portions of each of said sealing rings for unrestricted axial and radial distortive resilient spring action of said secondary sealing members upon operative mounting of said seal assembly in said shaft assembly to supply a face loading force to each of said sealing rings and simultaneously interlock said sealing rings, secondary sealing members and shaft assembly parts, and the axially directed surface portions of said sealing ring seats being at least coextensive with the first-named end surface portions of said secondary sealing members for unrestricted transmission of loading force to said sealing rings upon operative mounting of said seal assembly, the improvement which comprises the effective frustoconical shape of each of said secondary sealing members being formed on a molded angle which falls between about 25° and about 35°, and the ratio of radial thickness of each of said secondary sealing members measured perpendicular to the longitudinal axis thereof to average effective thickness measured normal to the effective frusto-conical shape of said secondary sealing members being between about 1.25 to about 2.25 to provide stable operation of said seal assembly.

References Cited by the Examiner

UNITED STATES PATENTS

| | | | |
|---|---|---|---|
| 2,214,243 | 9/1940 | Casson | 277—90 |
| 2,871,039 | 1/1959 | Payne | 277—92 |
| 3,180,648 | 4/1965 | Kupfert et al. | 277—92 |
| 3,185,488 | 5/1965 | Christensen et al. | 277—42 |

LAVERNE D. GEIGER, *Primary Examiner.*

J. S. MEDNICK, *Assistant Examiner.*

Dedication 3,291,494.—*Seymour A. Hatch,* Forest Park, *James P. Morley,* Morton Grove, and *Richard W. Blair,* Arlington Heights, Ill. END FACE SEAL ASSEMBLY. Patent dated Dec. 13, 1966. Dedication filed Mar. 16, 1972, by the assignee, *Chicago Rawhide Manufacturing Company.*
Hereby dedicates to the Public the entire term of said patent.
[*Official Gazette July 25, 1972.*]